(12) United States Patent
Hara

(10) Patent No.: US 12,494,225 B1
(45) Date of Patent: Dec. 9, 2025

(54) MAGNETIC DISK DEVICE AND METHOD OF CONTROLLING THE SAME

(71) Applicants: Kabushiki Kaisha Toshiba, Tokyo (JP); Toshiba Electronic Devices & Storage Corporation, Tokyo (JP)

(72) Inventor: Takeyori Hara, Kawasaki Kanagawa (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 0 days.

(21) Appl. No.: 19/035,451

(22) Filed: Jan. 23, 2025

(30) Foreign Application Priority Data

Jul. 30, 2024 (JP) .................. 2024-122961

(51) Int. Cl.
  *G11B 5/55* (2006.01)
  *G11B 5/012* (2006.01)
  *G11B 5/596* (2006.01)

(52) U.S. Cl.
  CPC ........... *G11B 5/5573* (2013.01); *G11B 5/012* (2013.01); *G11B 5/5547* (2013.01)

(58) Field of Classification Search
  CPC ... G11B 5/4873; G11B 5/5547; G11B 5/5552; G11B 5/5556; G11B 5/596; G11B 21/106; G11B 2005/001; G11B 5/4833; G11B 5/5586; G11B 5/5578; G11B 5/4813; G11B 5/59622; G11B 5/59666

See application file for complete search history.

(56) References Cited

U.S. PATENT DOCUMENTS

| | | | |
|---|---|---|---|
| 9,053,724 B1 * | 6/2015 | Chahwan | G11B 5/59694 |
| 10,381,030 B1 | 8/2019 | Liu | |
| 10,984,827 B2 | 4/2021 | Miyamoto et al. | |
| 11,189,310 B1 | 11/2021 | Calfee et al. | |
| 11,817,122 B1 | 11/2023 | Nakagawa et al. | |
| 2021/0012796 A1 | 1/2021 | Miyamoto et al. | |

FOREIGN PATENT DOCUMENTS

JP  2021-15659 A  2/2021

* cited by examiner

*Primary Examiner* — Nabil Z Hindi
(74) *Attorney, Agent, or Firm* — Kim & Stewart LLP

(57) ABSTRACT

According to one embodiment, a magnetic disk device comprises a first actuator which displaces magnetic heads in a radial direction of the magnetic disks, second actuators which displace the magnetic heads in a direction along the radial direction of the magnetic disks independently from each other, third actuators which displace the magnetic heads in directions opposite to each other along the radial direction of the magnetic disks by a same amount at a same time, and a controller which controls driving of the first actuator, driving of the second actuators and driving of the third actuators.

6 Claims, 9 Drawing Sheets

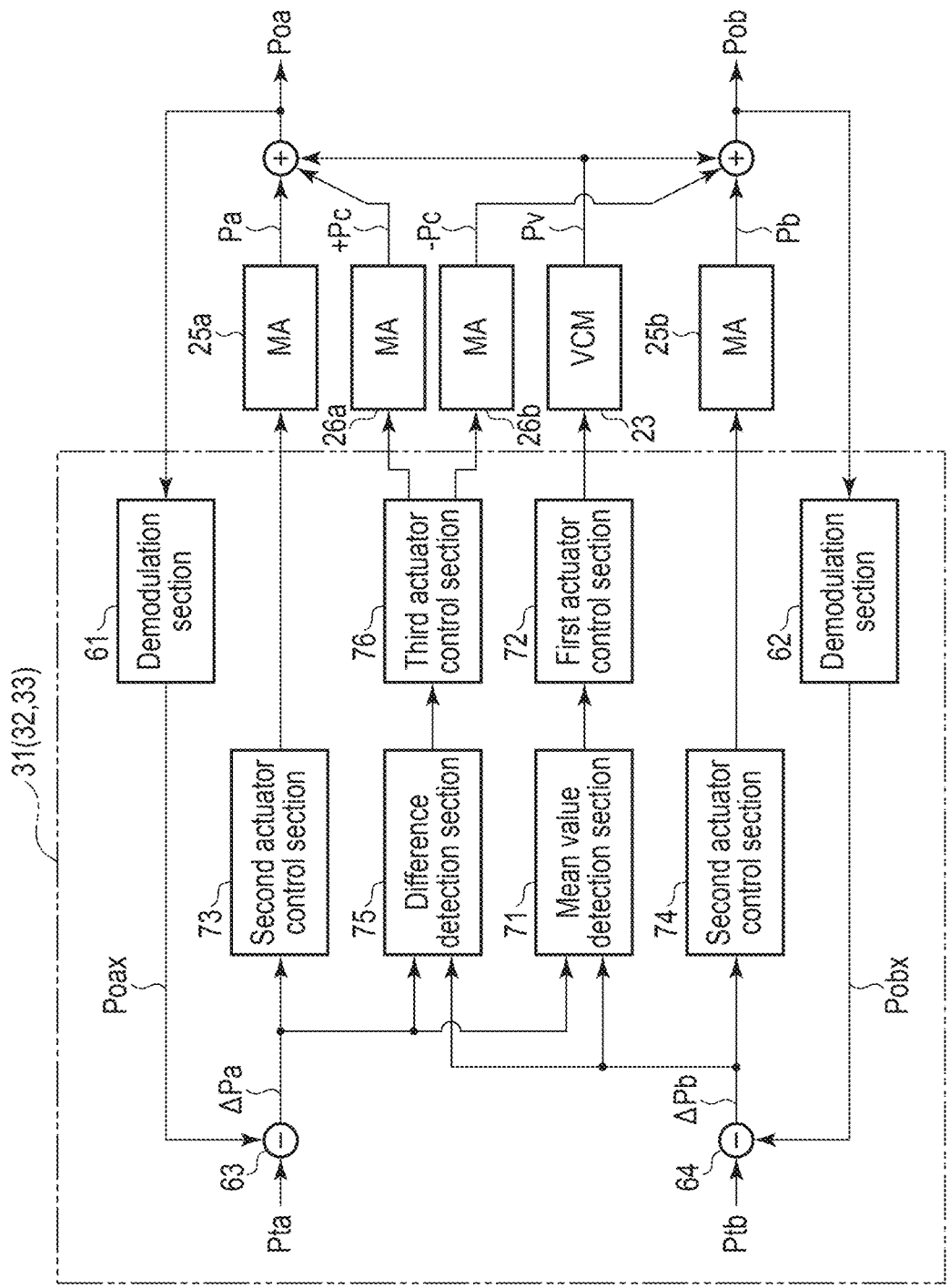
F I G. 6

MAGNETIC DISK DEVICE AND METHOD OF CONTROLLING THE SAME

CROSS-REFERENCE TO RELATED APPLICATIONS

This application is based upon and claims the benefit of priority from Japanese Patent Application No. 2024-122961, filed Jul. 30, 2024, the entire contents of which are incorporated herein by reference.

FIELD

Embodiments described herein relate generally to a magnetic disk device comprising a magnetic disk and a magnetic head, and a method of controlling the same.

BACKGROUND

Magnetic disk devices each of which comprises a circular magnetic disk including a pair of recording surfaces in an obverse-reverse relationship and a plurality of magnetic heads which write and read data to each the corresponding recoding surface of the magnetic disk move the magnetic heads to the respective target positions (write positions or read positions) on each recording surface of the magnetic disk by driving a motor (voice coil motor) when data is written and read by the magnetic heads, and further cause the magnetic heads to follow the respective target tracks at the respective target positions (in other words, track following or tracking).

To supplement the accuracy of tracking by this motor driving, magnetic disk devices each of which comprises a plurality of microactuators slightly displacing the magnetic heads in the radial direction of the magnetic disk independently from each other are also known. This magnetic disk device comprising the microactuators can perform control for moving the magnetic heads to the respective target positions on each recording surface of the magnetic disk and further causing the magnetic heads to follow the respective target tracks at the respective target positions, what is called dual surface simultaneous positioning control.

The displacement amount of each magnetic head by the driving of each microactuator is small. Therefore, it is difficult to accurately cause the magnetic heads to follow the respective target tracks when, for example, the difference between the target position of one magnetic head and the target position of the other magnetic head is large in dual surface simultaneous positioning control.

BRIEF DESCRIPTION OF THE DRAWINGS

FIG. 6 is a block diagram showing the seeking/tracking control section of a controller according to a first embodiment.

DETAILED DESCRIPTION

According to one embodiment, a magnetic disk device comprising: at least one circular magnetic disk including a pair of recording surfaces in an obverse-reverse relationship; a plurality of magnetic heads which write and read data to each the corresponding recording surface of the magnetic disks; a first actuator which displace the magnetic heads in a radial direction of the magnetic disks between inner and outer circumferences of the magnetic disks; a plurality of second actuators which displace the magnetic heads in a direction along the radial direction of the magnetic disks independently from each other; a plurality of third actuators which displace the magnetic heads in directions opposite to each other along the radial direction of the magnetic disks by a same amount at a same time; and a controller which moves the magnetic heads to respective target positions on the recording surfaces of the magnetic disks and further causes the magnetic heads to follow respective target tracks at the respective target positions by controlling driving of the first actuator, driving of the second actuators and driving of the third actuators.

(1) A first embodiment will be described with reference to the accompanying drawings.

Figure 1:
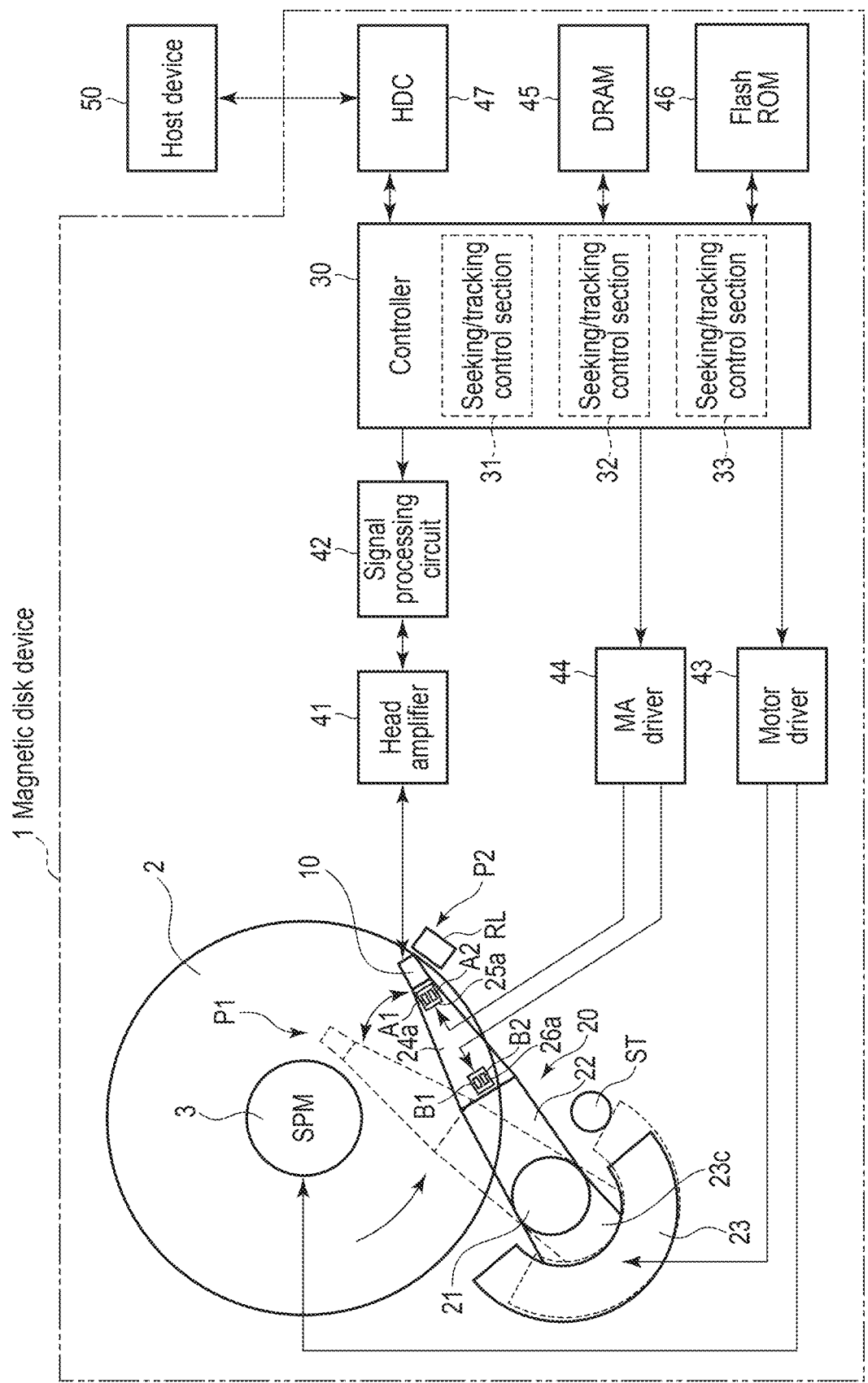
FIG. 1 is a diagram showing the overall configuration of each embodiment.

As shown in FIG. 1, a magnetic disk device 1 includes magnetic disks 2 each of which is a recording medium, a spindle motor 3 which rotates and drives the magnetic disks 2, and magnetic heads 10 which write and read data to the magnetic disks 2.

Figure 2:
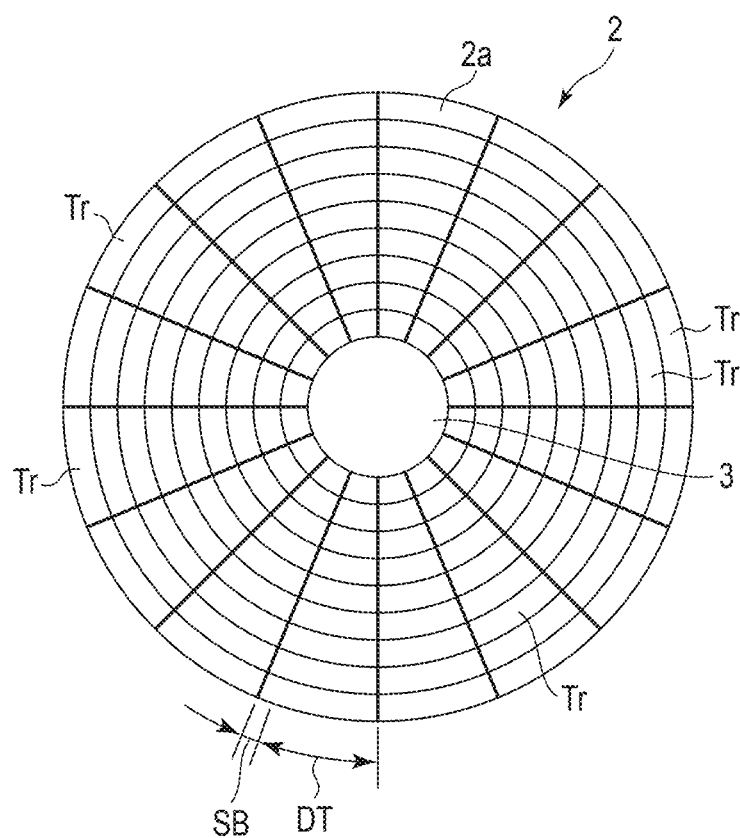
FIG. 2 is a diagram showing the configuration of one recording surface of a magnetic disk according to each embodiment.

As shown in FIG. 2, each magnetic disk 2 has a circular shape which is coaxially fitted onto the rotation axis of the spindle motor 3, and includes a large number of tracks Tr concentrically arranged in a circumferential direction. Each track Tr includes a servo sector consisting of a servo pattern SB in which positional data is recorded and a data area DT in which write data is stored.

Figure 3:
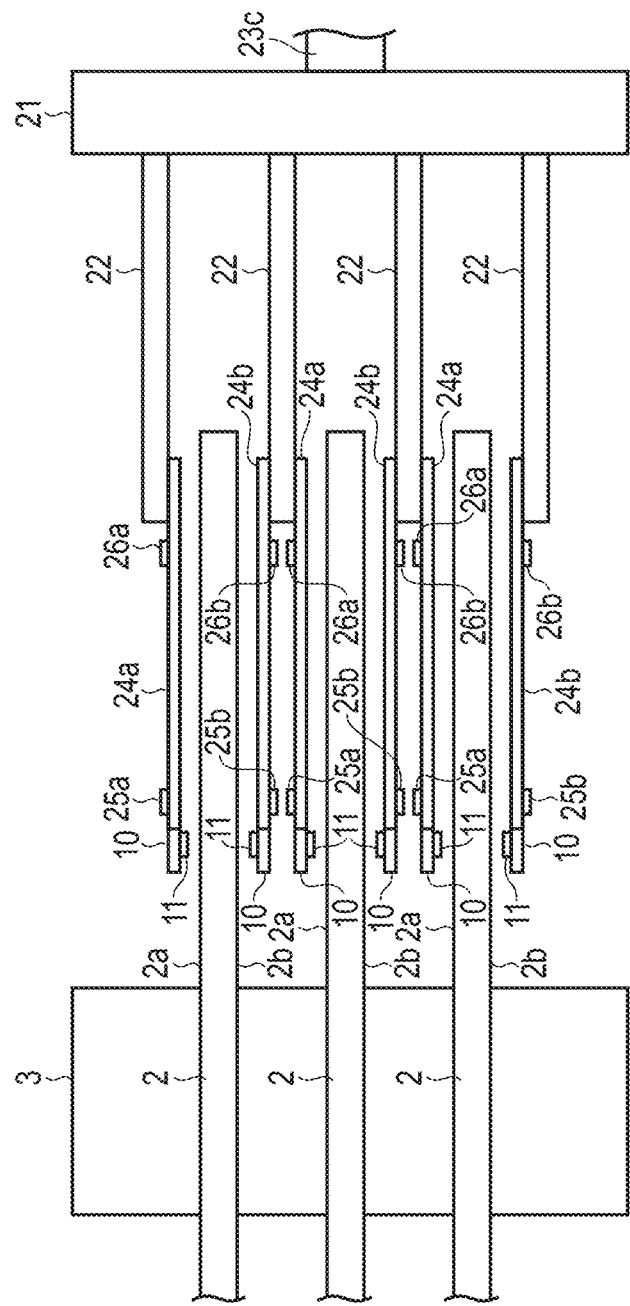
FIG. 3 is a diagram showing the configuration of each magnetic disk, each magnetic head and each microactuator with the surrounding portion according to each embodiment.

As shown in FIG. 3, each magnetic disk 2 includes a pair of recording surfaces 2a and 2b in an obverse-reverse relationship. These magnetic disks 2 are coaxially provided in the spindle motor 3 at predetermined intervals. The magnetic heads 10 are provided such that they face the recording surfaces 2a and 2b of the magnetic disks 2.

Each magnetic head 10 includes a slider 11 and includes a write element and a read element for data in the slider 11. When each magnetic disk 2 is rotated, the slider 11 floats by the air pressure of the rotation, and causes the magnetic head 10 to float on the magnetic disk 2.

The magnetic heads 10 are held by an actuator (first actuator) 20. As shown in FIG. 3, the actuator 20 includes a rotation axis 21. The actuator 20 includes, as holding members which hold the magnetic heads 10, a plurality of arms 22 attached to the rotation axis 21, and a plurality of suspension members 24a and 24b attached to the distal end portion of the arm 22.

The arms 22 of the actuator 20 are provided at intervals such that one magnetic disk 2 is interposed between two arms 22. Each suspension member 24a is located on a side corresponding to the recording surface 2a of the magnetic disk 2. Each suspension member 24b is located on a side corresponding to the recording surface 2b of the magnetic disk 2.

To the distal end portion of each suspension member 24a, a corresponding magnetic head 10 is attached, and this magnetic head 10 faces the recording surface 2a of the magnetic disk 2. To the distal end portion of each suspension member 24b, a corresponding magnetic head 10 is attached, and this magnetic head 10 faces the recording surface 2b of the magnetic disk 2.

Further, the actuator 20 includes a voice coil motor 23 which revolves the actuator 20 around the rotation axis 21, and displace the magnetic heads 10 in the radial direction of each magnetic disk 2 between the first position P1 indicated by the broken lines in the figure on the inner circumferential side of each magnetic disk 2 and the second position P2 indicated by the solid lines in the figure on the outer circumferential side by the revolution of the actuator 20 around the rotation axis 21, the arms 22 and the suspension members 24a and 24b based on the driving of the voice coil motor 23.

The voice coil motor 23 includes a coil 23c, a magnet and a yoke, and revolves the arm 22 and suspension members 24a and 24b of the actuator 20 when driving current is supplied to the coil 23c.

In the distal end portion of the suspension member 24a on a side facing the recording surface 2a of the magnetic disk 2 of the top stage (first stage), a microactuator (second actuator) 25a for supplementing the accuracy of tracking by the driving of the voice coil motor 23 is provided. In the distal end portion of the suspension member 24b on a side facing the recording surface 2b of the magnetic disk 2 of the same top stage (first stage), a microactuator (second actuator) 25b for supplementing the accuracy of tracking by the driving of the voice coil motor 23 is provided.

Figure 4:
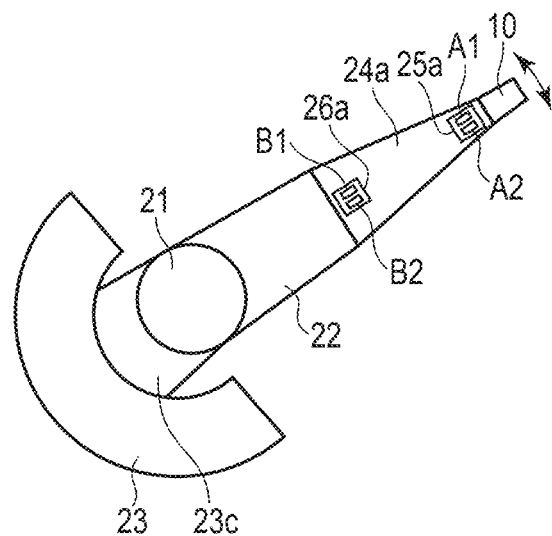
FIG. 4 is a diagram showing the microscopic displacement of each magnetic head by a second actuator according to each embodiment.

The microactuator 25a includes a pair of piezoelectric elements A1 and A2. By driving the piezoelectric elements A1 and A2, the microactuator 25a slightly displaces (Slightly moves) the magnetic head 10 of the suspension member 24a in a direction along the radial direction of the magnetic disk 2 as shown in FIG. 4 independently from the movement of the magnetic head 10 of the suspension member 24b.

The microactuator 25b includes a pair of piezoelectric elements A1 and A2. By driving the piezoelectric elements A1 and A2, the microactuator 25b slightly displaces (Slightly moves) the magnetic head 10 of the suspension member 24b in a direction along the radial direction of the magnetic disk 2 as shown in FIG. 4 independently from the movement of the magnetic head 10 of the suspension member 24a.

Similarly, in the distal end portion of the suspension member 24a on a side facing the recording surface 2a of the magnetic disk 2 of the middle stage (second stage), the microactuator 25a is provided. In the distal end portion of the suspension member 24b on a side facing the recording surface 2b of the same magnetic disk 2, the microactuator 25b is provided. In the distal end portion of the suspension member 24a on a side facing the recording surface 2a of the magnetic disk 2 of the bottom stage (third stage), the microactuator 25a is provided. In the distal end portion of the suspension member 24b on a side facing the recording surface 2b of the same magnetic disk 2, the microactuator 25b is provided.

In the proximal end portion (on the arm 22 side) of the suspension member 24a on a side facing the recording surface 2a of the magnetic disk 2 of the top stage (first stage), a microactuator (third actuator) 26a for supplementing the accuracy of tracking by the driving of the voice coil motor 23 is provided. In the proximal end portion (on the arm 22 side) of the suspension member 24b on a side facing the recording surface 2b of the magnetic disk 2 of the same top stage (first stage), a microactuator (third actuator) 26b for supplementing the accuracy of tracking by the driving of the voice coil motor 23 is provided.

Figure 5:
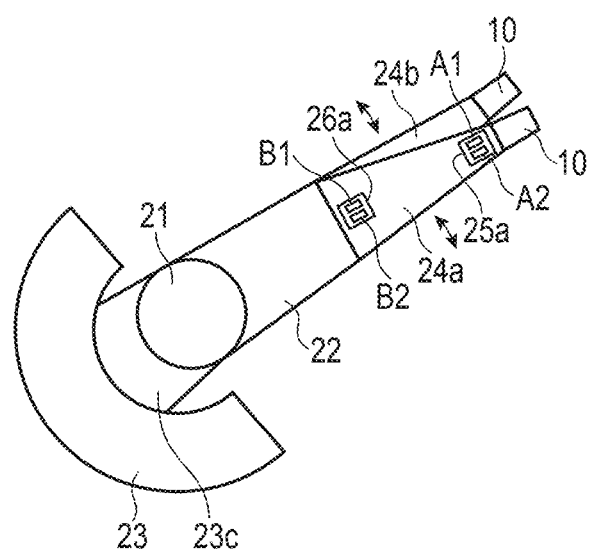
FIG. 5 is a diagram showing the microscopic displacement of each holding member by a third actuator according to each embodiment.

The microactuator 26a includes a pair of piezoelectric elements B1 and B2. By driving the piezoelectric elements B1 and B2, the microactuator 26a slightly displaces (Slightly moves) the suspension member 24a holding the magnetic head 10 in a direction along the radial direction of the magnetic disk 2 as shown in FIG. 5 independently from the movement of the suspension member 24b.

The microactuator 26b includes a pair of piezoelectric elements B1 and B2. By driving the piezoelectric elements B1 and B2, the microactuator 26b slightly displaces (Slightly moves) the suspension member 24b holding the magnetic head 10 in a direction along the radial direction of the magnetic disk 2 as shown in FIG. 5 independently from the movement of the suspension member 24a.

It should be noted that the microactuators 26a and 26b slightly displace the suspension members 24a and 24b in directions opposite to each other by the same amount at the same time by the driving control of the controller 30 described later.

Near the actuator 20, a stopper ST and a ramp mechanism RL are provided. The stopper ST restricts the movement position of each magnetic head 10 on the inner circumferential side of each magnetic disk 2. The ramp mechanism RL evacuates each magnetic head 10 from the upper side of each magnetic disk 2 when the spindle motor 3 stops.

Further, as shown in FIG. 1, the magnetic disk device 1 includes the controller 30 which serves as the main element for control, a head amplifier 41 which amplifies signals from/to each magnetic head 10, a signal processing circuit 42 provided in the connection between the head amplifier 41 and the controller 30, a motor driver 43 which drives the spindle motor 3 and the voice coil motor 23 in accordance with the order of the controller 30, a microactuator (MA) driver 44 which drives the microactuators 25a and 25b and the microactuators 26a and 26b in accordance with the order of the controller 30, a DRAM 45 which is a memory in which programs and the like necessary for the control of the controller 30 are stored, a flash ROM 46 which is a memory in which various types of data necessary for the control of the controller 30 are stored, and a hard disk controller (HDC) 47 provided in the connection between the controller 30 and an external host device 50.

The head amplifier 41 amplifies data signals for write from the signal processing circuit 42 to each magnetic head 10 and amplifies data signals read in each magnetic head 10. The signal processing circuit 42 appropriately processes data signals for write from the controller 30 to each magnetic head 10 and supplies the data signals to the head amplifier 42. Further, the signal processing circuit 42 appropriately processes read data signals amplified in the head amplifier 41 and supplies the read data signals to the controller 30.

The controller 30 controls the driving of the actuator 20, the driving of the microactuators 25a and 25b and the driving of the microactuators 26a and 26b such that the magnetic heads 10 are moved to and follow the target positions Pta and Ptb on the recording surfaces 2a and 2b of the magnetic disks 2. The controller 30 includes seeking/tracking control sections 31, 32 and 33 as the main functions related to this seeking and tracking.

The seeking/tracking control section 31 controls the seeking and tracking of the pair of magnetic heads 10 for the magnetic disk 2 of the first stage. The seeking/tracking control section 32 controls the seeking and tracking of the pair of magnetic heads 10 for the magnetic disk 2 of the second stage. The seeking/tracking control section 33 controls the seeking and tracking of the pair of magnetic heads 10 for the magnetic disk 2 of the third stage. Since the configurations of these seeking/tracking control sections 31, 32 and 33 are the same as each other, the configuration of the seeking/tracking control section 31 is shown in FIG. 6 as the representative example.

The seeking/tracking control section 31 includes demodulation sections (demodulation units) 61 and 62, difference detection sections (first difference detection units) 63 and 64, a mean value detection section (mean value detection unit) 71, a first actuator control section (first actuator control unit) 72, second actuator control sections (second actuator control units) 73 and 74, a difference detection section (second difference detection unit) 75 and a third actuator control section (third actuator control unit) 76.

The demodulation section 61 demodulates the positional data of the servo pattern SB included in the read data of the magnetic head 10 on the recording surface 2a of each magnetic disk 2, thereby capturing position Poa of this magnetic head 10 as following position Poax for target position Pta at the time of the seeking and tracking of the magnetic head 10.

The demodulation section 62 demodulates the positional data of the servo pattern SB included in the read data of the magnetic head 10 on the recording surface 2b of each magnetic disk 2, thereby capturing position Pob of this magnetic head 10 as following position Pobx for target position Ptb at the time of the seeking and tracking of the magnetic head 10.

The difference detection section 63 detects difference ΔPa in the above following position Poax of the magnetic head 10 on the recording surface 2a of the magnetic disk 2 for target position Pta at the time of the seeking and tracking of this magnetic head 10.

The difference detection section 64 detects difference ΔPb in the above following position Pobx of the magnetic head 10 on the recording surface 2b of the magnetic disk 2 for target position Ptb at the time of the seeking and tracking of this magnetic head 10.

The mean value detection section 71 detects the mean value of the detection results (differences) ΔPa and ΔPb of the difference detection sections 63 and 64.

The first actuator control section 72 controls displacement amount Pv of each magnetic head 10 applied by the actuator 20 by the driving of the voice coil motor 23 in accordance with the detection result (mean value) of the mean value detection section 71.

The second actuator control section 73 controls displacement amount Pa of each magnetic head 10 on the recording surface 2a side by the driving of the microactuator 25a in accordance with detection result (difference) ΔPa of the difference detection section 63.

The second actuator control section 74 controls displacement amount Pb of each magnetic head 10 on the recording surface 2b side by the driving of the microactuator 25b in accordance with detection result (difference) ΔPb of the difference detection section 64.

The difference detection section 75 detects the difference between detection result (difference) ΔPa of the difference detection section 63 and detection result (difference) ΔPb of the difference detection section 64.

The third actuator control section 76 controls displacement amounts +Pc and −Pc of the suspension members (holding members) 24a and 24b by the driving of the microactuators 26a and 26b in directions opposite to each other by the same amount based on the detection result of the difference detection section 75 (the difference between ΔPa and ΔPb) at the same time. To displace the suspension members (holding members) 24a and 24b in directions opposite to each other by the same amount at the same time is called opposite phase driving.

Displacement amount Pv controlled by the first actuator control section 72, displacement amount Pa controlled by the second actuator control section 73 and displacement amount +Pc controlled by the third actuator control section 76 are added up, and this combined amount is position Poa of the magnetic head 10 on the recording 2a side (one of the magnetic heads 10).

Displacement amount Pv controlled by the first actuator control section 72, displacement amount Pb controlled by the second actuator control section 74 and displacement amount −Pc controlled by the third actuator control section 76 are added up, and this amount is position Pob of the other magnetic head 10 on the recording 2b side.

Figure 7:
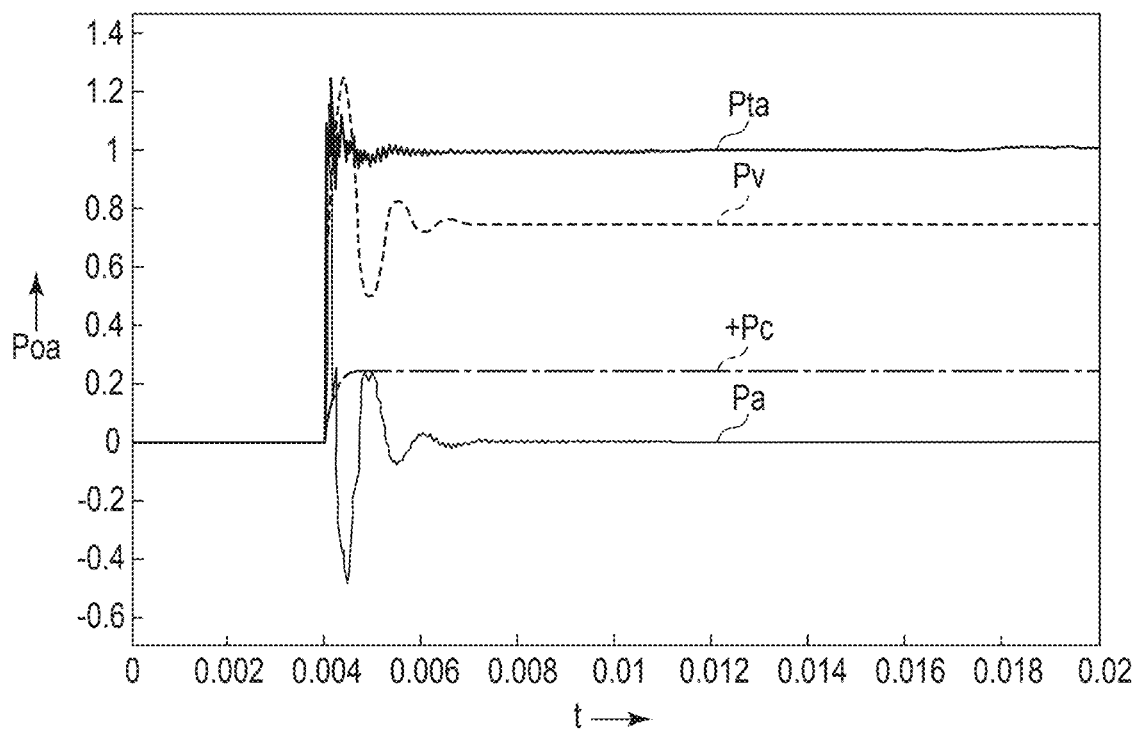
FIG. 7 is a plot showing, when the target positions of magnetic heads are offset each other in a DC manner, the displacement amount of one of the magnetic heads by a first actuator, the displacement amount of one of the magnetic heads by the second actuator and the displacement amount of one of the magnetic heads by the third actuator according to each embodiment.
Figure 8:
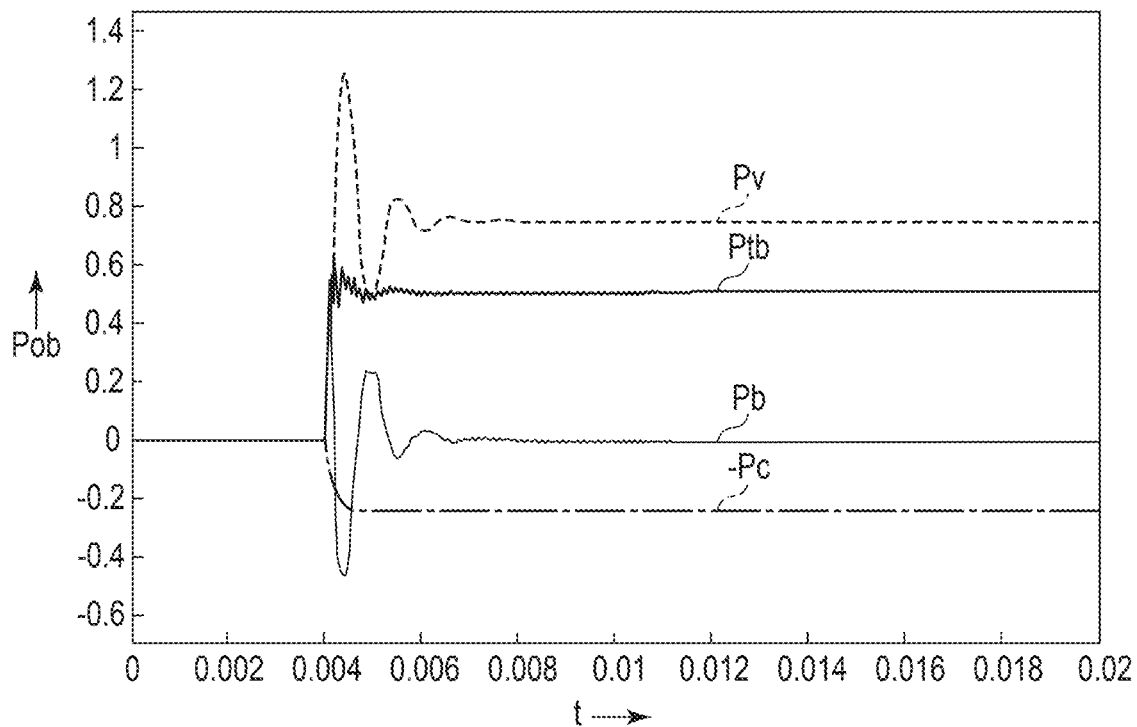
FIG. 8 is a plot showing, when the target positions of magnetic heads are offset each other in a DC manner, the displacement amount of the other magnetic head by the first actuator, the displacement amount of the other magnetic head by the second actuator and the displacement amount of the other magnetic head by the third actuator according to each embodiment.

When target positions Pta and Ptb of the magnetic heads 10 are offset each other in a DC manner and added, the time response of displacement amounts Pv, Pa and +Pc related to one of the magnetic heads 10 is shown in FIG. 7, and the time response of displacement amounts Pv, Pa and −Pc related to the other magnetic head 10 is shown in FIG. 8.

Figure 9:
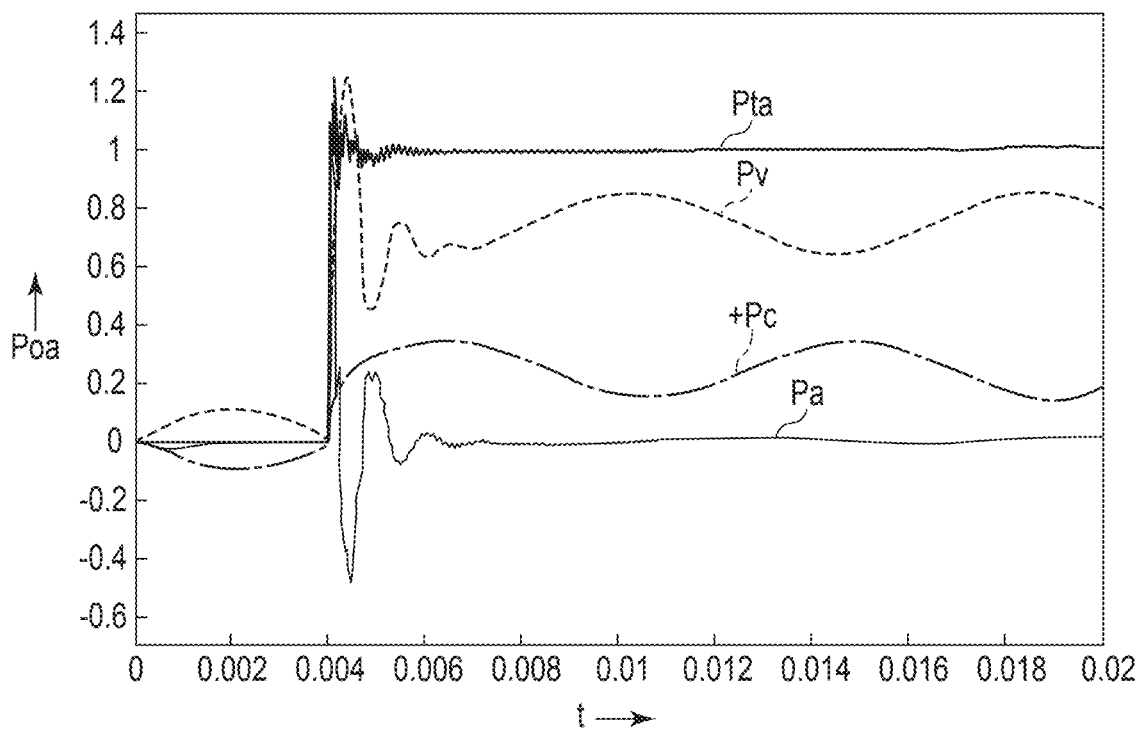
FIG. 9 is a plot showing, when the target positions of magnetic heads are offset each other in an AC manner, the displacement amount of one of the magnetic heads by the first actuator, the displacement amount of one of the magnetic heads by the second actuator and the displacement amount of one of the magnetic heads by the driving of the third actuator according to each embodiment.
Figure 10:
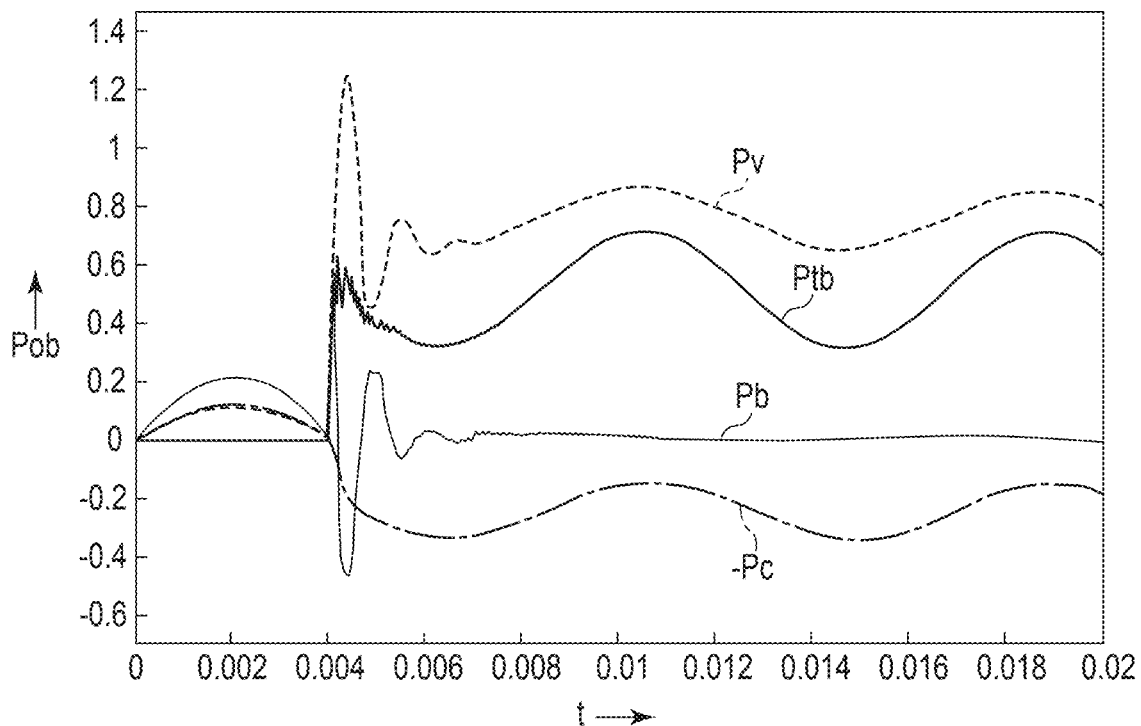
FIG. 10 is a plot showing, when the target positions of magnetic heads are offset each other in an AC manner, the displacement amount of the other magnetic head by the first actuator, the displacement amount of the other magnetic head by the second actuator and the displacement amount of the other magnetic head by the third actuator according to each embodiment.

When target positions Pta and Ptb of the magnetic heads 10 are offset each other in an AC manner and added, the time response of displacement amounts Pv, Pa and +Pc related to one of the magnetic heads 10 is shown in FIG. 9, and the time response of displacement amounts Pv, Pa and −Pc related to the other magnetic head 10 is shown in FIG. 10.

As described above, by detecting the mean value of difference ΔPa of the following position of one of the magnetic heads 10 for target position Pta of the magnetic head 10 and difference ΔPb of the following position of the other magnetic head 10 for target position Ptb, and controlling displacement amount Pv of each magnetic head 10 applied by the actuator 20 by the driving of the voice coil motor 23 in accordance with the mean value, it is possible to perform the control for moving the magnetic heads 10 to the respective target positions Pta and Ptb on the recording surfaces 2a and 2b of the magnetic disks 2 and causing the magnetic heads 10 to follow the respective target positions, what is called dual surface simultaneous positioning control.

In addition, displacement amount Pa of one of the magnetic heads 10 by the driving of the microactuator 25a is controlled in accordance with difference ΔPa of the following position of the magnetic head 10 for target position Pta of the magnetic head 10, and further, displacement amount Pb of the other magnetic head 10 by the driving of the microactuator 25b is controlled in accordance with difference ΔPb of the following position of the magnetic head 10 for target position Ptb of the magnetic head 10. This configuration can improve the accuracy of tracking performed by the driving of the voice coil motor 23 in dual surface simultaneous positioning control. Thus, the reliability of dual surface simultaneous positioning control is improved.

On that basis, difference ΔPa of following position Poax of the magnetic head 10 for target position Pta on the recording surface 2a of the magnetic disk 2 is detected, and further, difference ΔPb of the above following position Pobx of the magnetic head 10 for target position Ptb on the recording surface 2b of the magnetic disk 2 is detected. The suspension members 24a and 24b are displaced in directions opposite to each other by the same amount based on the difference between the detected differences ΔPa and ΔPb at the same time by the driving of the microactuators 26a and 26b. Thus, even when the difference (offset) between target position Pta of one of the magnetic heads 10 and target position Ptb of the other magnetic head 10 is large as shown in FIG. 7 to FIG. 10, displacement amount Pa or Pb by the driving of the microactuator 25a or 25b which is the second actuator does not uselessly increase.

In other words, even when the difference between target position Pta of one of the magnetic heads 10 and target position Ptb of the other magnetic head 10 is large, displacement amounts Pa and Pb by the driving of the microactuators 25a and 25b can be reduced. As displacement amounts Pa and Pb by the driving of the microactuators 25a and 25b can be reduced, the magnetic heads 10 can be caused to accurately follow the respective target positions Pta and Ptb.

Even when the difference between difference ΔPa of the following position of one of the magnetic heads 10 for target position Pta of this magnetic head 10 and difference ΔPb of the following position of the other magnetic head 10 for target position Ptb of this magnetic head is large, or when an eccentric positional gap is present between one of the magnetic heads 10 and the other magnetic head 10, in a manner similar to that of the above descriptions, displacement amount Pa or Pb by the driving of the microactuator 25a or 25b which is the second actuator does not uselessly increase.

Thus, even when the difference between difference ΔPa of the following position of one of the magnetic heads 10 for target position Pta of this magnetic head 10 and difference ΔPb of the following position of the other magnetic head 10 for target position Ptb of this magnetic head is large, or when an eccentric positional gap is present between one of the magnetic heads 10 and the other magnetic head 10, displacement amounts Pa and Pb by the driving of the microactuators 25a and 25b can be reduced. As displacement amounts Pa and Pb by the driving of the microactuators 25a and 25b can be reduced, the magnetic heads 10 can be caused to accurately follow the respective target positions Pta and Ptb.

(2) Second Embodiment

In a second embodiment, the configurations of the seeking/tracking control sections 31, 32 and 33 of a controller 30 are slightly different from the first embodiment.

Figure 11:
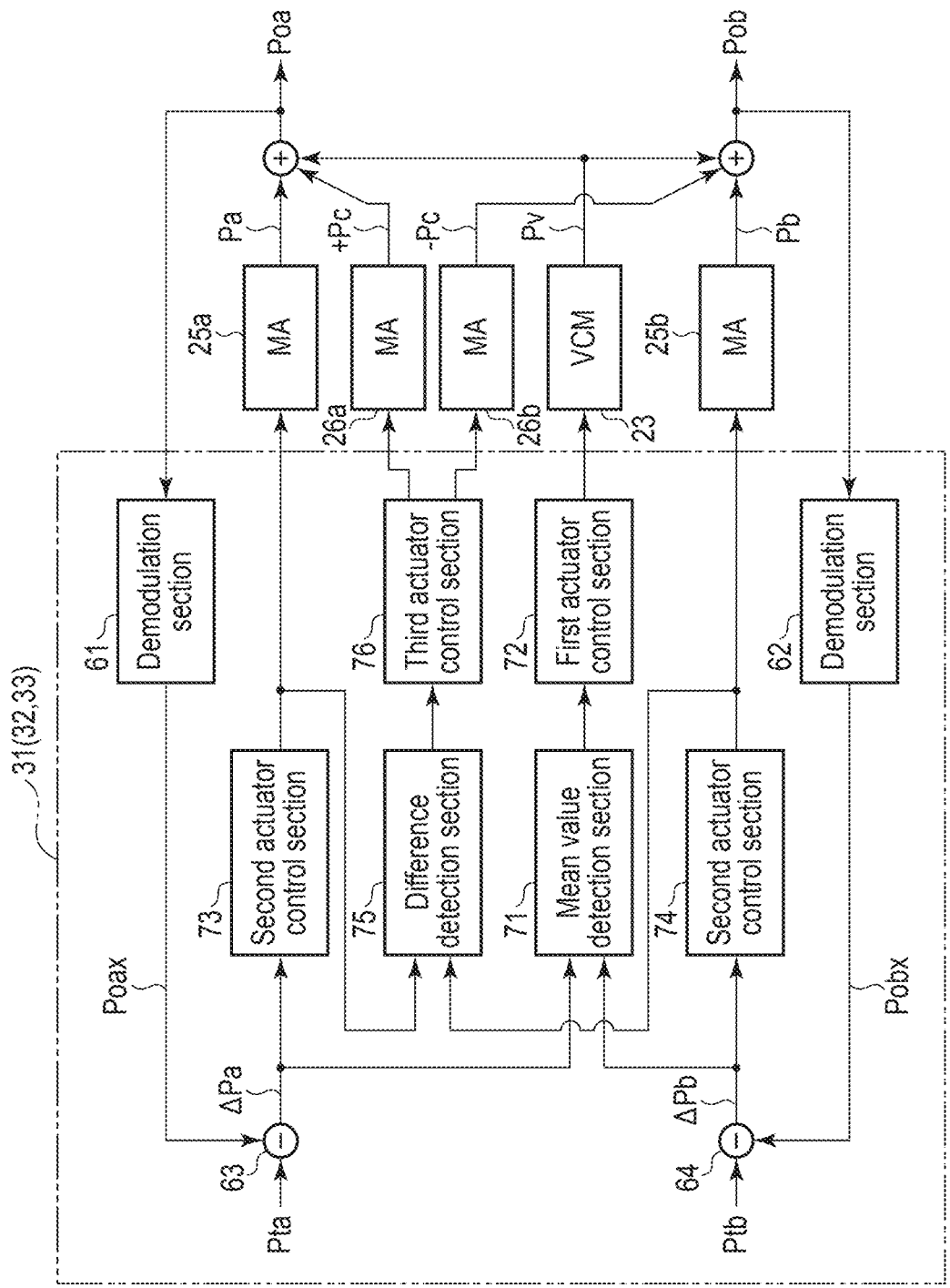
FIG. 11 is a block diagram showing the seeking/tracking control section of a controller according to a second embodiment.

Specifically, as shown in FIG. 11, a difference detection section 75 detects the difference between the control amount of a second actuator control section 73 for displacement amount Pa of one of magnetic heads 10 by the driving of an actuator 25a and the control amount of the second actuator control section 73 for displacement amount Pb of the other magnetic head 10 by the driving of an actuator 25b.

The other configurations are the same as the first embodiment.

In this second embodiment, similarly, even when the difference between target position Pta of one of the magnetic heads 10 and target position Ptb of the other magnetic head 10 is large, or even when the difference between difference ΔPa of the following position of one of the magnetic heads 10 for target position Pta of the magnetic head 10 and difference ΔPb of the following position of the other magnetic head 10 for target position Ptb of the magnetic head is large, or even when an eccentric positional gap is present between one of the magnetic heads 10 and the other magnetic head 10, displacement amounts Pa and Pb by the driving of the microactuators 25a and 25b can be reduced. In this manner, the magnetic heads 10 can be caused to accurately follow the respective target positions Pta and Ptb.

(3) Third Embodiment

In a third embodiment, the configurations of the seeking/tracking control sections 31, 32 and 33 of a controller 30 are slightly different from the first embodiment.

Figure 12:
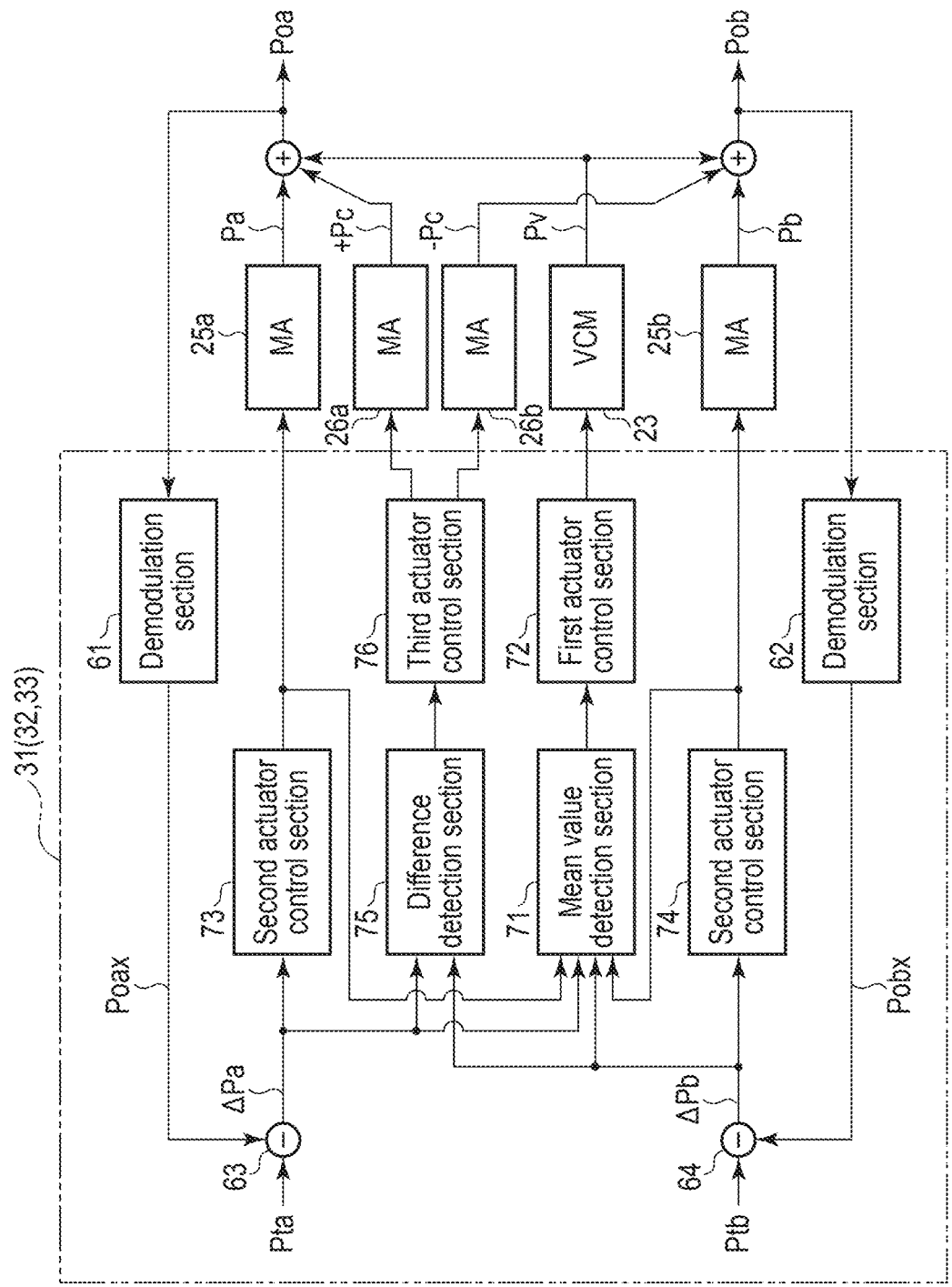
FIG. 12 is a block diagram showing the seeking/tracking control section of the controller according to the second embodiment.

Specifically, as shown in FIG. 12, a mean value detection section 71 calculates the mean value of the control amount of a second actuator control section 73 for displacement amount Pa of one of magnetic heads 10 by the driving of an actuator 25a and the control amount of a second actuator control section 74 for displacement amount Pb of the other magnetic head 10 by the driving of an actuator 25b, further calculates the mean value of detection result (difference) ΔPa of a difference detection section 63 and detection result (difference) ΔPb of a difference detection section 64, and detects a value obtained by adding up these calculated mean values.

The other configurations are the same as the first embodiment.

In this third embodiment, similarly, even when the difference between target position Pta of one of the magnetic heads 10 and target position Ptb of the other magnetic head 10 is large, or even when the difference between difference ΔPa of the following position of one of the magnetic heads 10 for target position Pta of the magnetic head 10 and difference ΔPb of the following position of the other magnetic head 10 for target position Ptb of the magnetic head 10 is large, or even when an eccentric positional gap is present between one of the magnetic heads 10 and the other magnetic head 10, displacement amounts Pa and Pb by the driving of the microactuators 25a and 25b can be reduced.

In this manner, the magnetic heads 10 can be caused to accurately follow the respective target positions Pta and Ptb.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   at least one circular magnetic disk including a pair of recording surfaces in an obverse-reverse relationship;
   a plurality of magnetic heads which write and read data to each the corresponding recording surface of the magnetic disks;
   a first actuator which displaces the magnetic heads in a radial direction of the magnetic disks between inner and outer circumferences of the magnetic disks;
   a plurality of second actuators which displace the magnetic heads in a direction along the radial direction of the magnetic disks independently from each other;
   a plurality of third actuators which displace the magnetic heads in directions opposite to each other along the radial direction of the magnetic disks by a same amount at a same time; and
   a controller which moves the magnetic heads to respective target positions on the recording surfaces of the magnetic disks and further causes the magnetic heads to follow respective target tracks at the respective target positions by controlling driving of the first actuator, driving of the second actuators and driving of the third actuators.

2. The device of claim 1, wherein
   the first actuator includes respective holding members which hold the magnetic heads, includes a voice coil motor which revolves the holding members in common, and displace the magnetic heads in the radial direction of the magnetic disks between the inner and outer circumferences of the magnetic disks by revolution of the holding members based on driving of the voice coil motor,
   each of the second actuators includes a pair of piezoelectric elements and slightly displaces the corresponding magnetic head in a direction along the radial direction of the magnetic disks independently from each other by driving the pair of piezoelectric elements, and
   each of the third actuators includes a pair of piezoelectric elements, and the third actuators slightly displace the holding members which hold the magnetic heads in directions opposite to each other along the radial direction of the magnetic disks by a same amount at a same time by driving the pair of piezoelectric elements.

3. The device of claim 1, wherein
   the controller includes:
   a plurality of first difference detection sections which detect differences of following positions of the magnetic heads for the target positions at the time of seeking and tracking;
   a mean value detection section which detects a mean value of detection results of the first difference detection sections;
   a first actuator control section which controls a displacement amount of each of the magnetic heads applied by driving the first actuator in accordance with a detection result of the mean value detection section;
   a plurality of second actuator control sections which control displacement amounts of the magnetic heads applied by driving the second actuators in accordance with detection results of the first difference detection sections;
   a second difference detection section which detects a difference between detection results of the first difference detection sections; and
   a third actuator control section which controls displacement amounts of the magnetic heads applied by driving the third actuators in directions opposite to each other in accordance with a detection result of the second difference detection section.

4. The device of claim 1, wherein
   the controller includes:
   a plurality of first difference detection sections which detect differences of following positions of the respective magnetic heads for the respective target positions at the time of seeking and tracking;
   a mean value detection section which detects a mean value of detection results of the first difference detection sections;
   a first actuator control section which controls a displacement amount of each of the magnetic heads applied by driving the first actuator in accordance with a detection result of the mean value detection section;
   a plurality of second actuator control sections which control displacement amounts of the magnetic heads applied by driving the second actuators in accordance with detection results of the first difference detection sections;
   a second difference detection section which detects a difference between control amounts of the second actuator control sections; and
   a third actuator control section which controls displacement amounts of the magnetic heads applied by driving the third actuators in directions opposite to each other in accordance with a detection result of the second difference detection section.

5. The device of claim 1, wherein
   the controller includes:
   a plurality of first difference detection sections which detect differences of following positions of the respective magnetic heads for the respective target positions at the time of seeking and tracking;
   a plurality of second actuator control sections which control displacement amounts of the magnetic heads applied by driving the second actuators in accordance with detection results of the first difference detection sections;
   a mean value detection section which obtains a mean value of control amounts of the second actuator control sections for the displacement amounts of the magnetic heads, obtains a mean value of detection results of the first difference detection sections, and detects a value obtained by adding up the obtained mean values;
   a first actuator control section which controls revolution of the first actuator by driving the motor and a displacement amount of the magnetic head in association with the revolution of the first actuator in accordance with a detection result of the mean value detection section;

a second difference detection section which detects a difference between detection results of the first difference detection sections; and a third actuator control section which controls displacement amounts of the magnetic heads applied by driving the third actuators in directions opposite to each other in accordance with a detection result of the second difference detection section.

6. A method of controlling a magnetic disk device comprising:

at least one circular magnetic disk including a pair of recording surfaces in an obverse-reverse relationship;

a plurality of magnetic heads which write and read data to each the corresponding recording surface of the magnetic disks;

a first actuator which displaces the magnetic heads in a radial direction of the magnetic disks between inner and outer circumferences of the magnetic disks;

a plurality of second actuators which displace the magnetic heads in a direction along the radial direction of the magnetic disks independently from each other; and a plurality of third actuators which displace the second actuators in directions opposite to each other along the radial direction of the magnetic disks by a same amount at a same time, the method comprising moving the magnetic heads to respective target positions on the recording surfaces of the magnetic disks and causing the magnetic heads to follow respective target tracks at the target positions by controlling driving of the first actuator, driving of the second actuators and driving of the third actuators.

* * * * *